United States Patent [19]
Chiang

[11] Patent Number: 5,740,837
[45] Date of Patent: Apr. 21, 1998

[54] MEANS FOR AUTOMATICALLY REGULATING WATER PRESSURE IN WATER PIPE

[76] Inventor: Swea Tong Chiang, No. 410, Chung Sun Road, She Koou Tsuen, Shern Gang Shiang, Taichung Hsien, Taiwan

[21] Appl. No.: 743,968

[22] Filed: Nov. 5, 1996

[51] Int. Cl.$^6$ ........................................ F15D 1/02
[52] U.S. Cl. ........................ 138/45; 138/46; 138/37; 138/31
[58] Field of Search .................. 138/26, 30, 31, 138/43, 45, 46, 37, 39, 40

[56] References Cited

U.S. PATENT DOCUMENTS

| | | | |
|---|---|---|---|
| 3,375,855 | 4/1968 | Deeks | 138/26 X |
| 3,532,128 | 10/1970 | Webb | 138/45 |
| 3,714,964 | 2/1973 | Livingston | 138/45 X |
| 4,266,576 | 5/1981 | Bradford | 138/45 X |
| 4,610,369 | 9/1986 | Mercier | 138/30 X |
| 4,679,597 | 7/1987 | Stein | 138/26 |
| 5,210,382 | 5/1993 | Paley et al. | 138/30 X |

*Primary Examiner*—Patrick F. Brinson
*Attorney, Agent, or Firm*—Bacon & Thomas

[57] ABSTRACT

Disclosed is a means for automatically regulating water pressure in water pipe mainly including a tube connected to and between two sections of water pipes. A plurality of pressure-reduction members and springs are alternately disposed in the tube. The pressure-reduction members have an external diameter slightly smaller than an inner diameter of the tube. Grooves or through holes are formed on a circumferential surface or bottom surface, respectively, of the pressure-reduction members for water to pass through. Whereby, when a small volume of water with low water pressure flows into the tube, the springs are in an extended state, allowing water flowing into the tube to freely pass the grooves around the pressure-reduction members and to enter into the springs via circumferential clearances of the springs, and finally flows out of the tube via the through holes on the lowest pressure-reduction member in the tube. And, when a large volume of water with high water pressure flows into the tube, the springs are compressed and the circumferential clearances thereof are reduced to limit water that can flow into the springs and flows out of the tube via the through holes on the lowest pressure-reduction member in the tube. Thereby, water pressure in water pipe is automatically regulated.

3 Claims, 2 Drawing Sheets

MEANS FOR AUTOMATICALLY REGULATING WATER PRESSURE IN WATER PIPE

BACKGROUND OF THE INVENTION

1. Field of the Invention

The present invention relates to a means for automatically regulating water pressure in water pipe, and particularly to a means which is connected to and between two sections of water pipes to automatically regulate water flow's pressure in water pipe, so that water can be steadily supplied.

2. Description of Prior Art

Unsteady water flow and water pressure in water pipe has been a common problem always found in bathrooms and toilet rooms. This prevents water from being supplied in a normal condition. Undesired conditions caused by such unsteady water flow and pressure include splashes due to overhigh water flow and pressure, as well as failed pressure-operated automatic switch and incomplete flushing due to overlow water pressure.

It is therefore tried by the inventor to develop a means for automatically regulating water pressure in water pipe to eliminate the above drawbacks existed in the conventional water supply via water pipe.

SUMMARY OF THE INVENTION

A primary object of the present invention is to provide a means for automatically regulating water pressure in water pipe. The means includes a tube in which more than one spring and pressure-reduction member are alternately disposed. The pressure-reduction members at higher positions are formed with more than one groove on a circumferential surface, and at a lowest position with more than one through hole on a bottom surface, for water to flow therethrough. Whereby, water flow passing through the springs is automatically regulated with changes in the clearances found on the circumferencial surface of the springs when the springs are compressed under high water pressure.

Another object of the present invention is to provide a means for automatically regulating water pressure in water pipe in which the pressure-reduction springs and members can be manufactured at low cost.

BRIEF DESCRIPTION OF THE DRAWINGS

The above and other objects of the present invention, as well as the detailed structure, the applied principles, the function and the performance of the present invention, all can be understood from the following detailed description of the preferred embodiment and the accompanying drawings, wherein.

DETAILED DESCRIPTION OF THE PREFERRED EMBODIMENT

Figure 1:
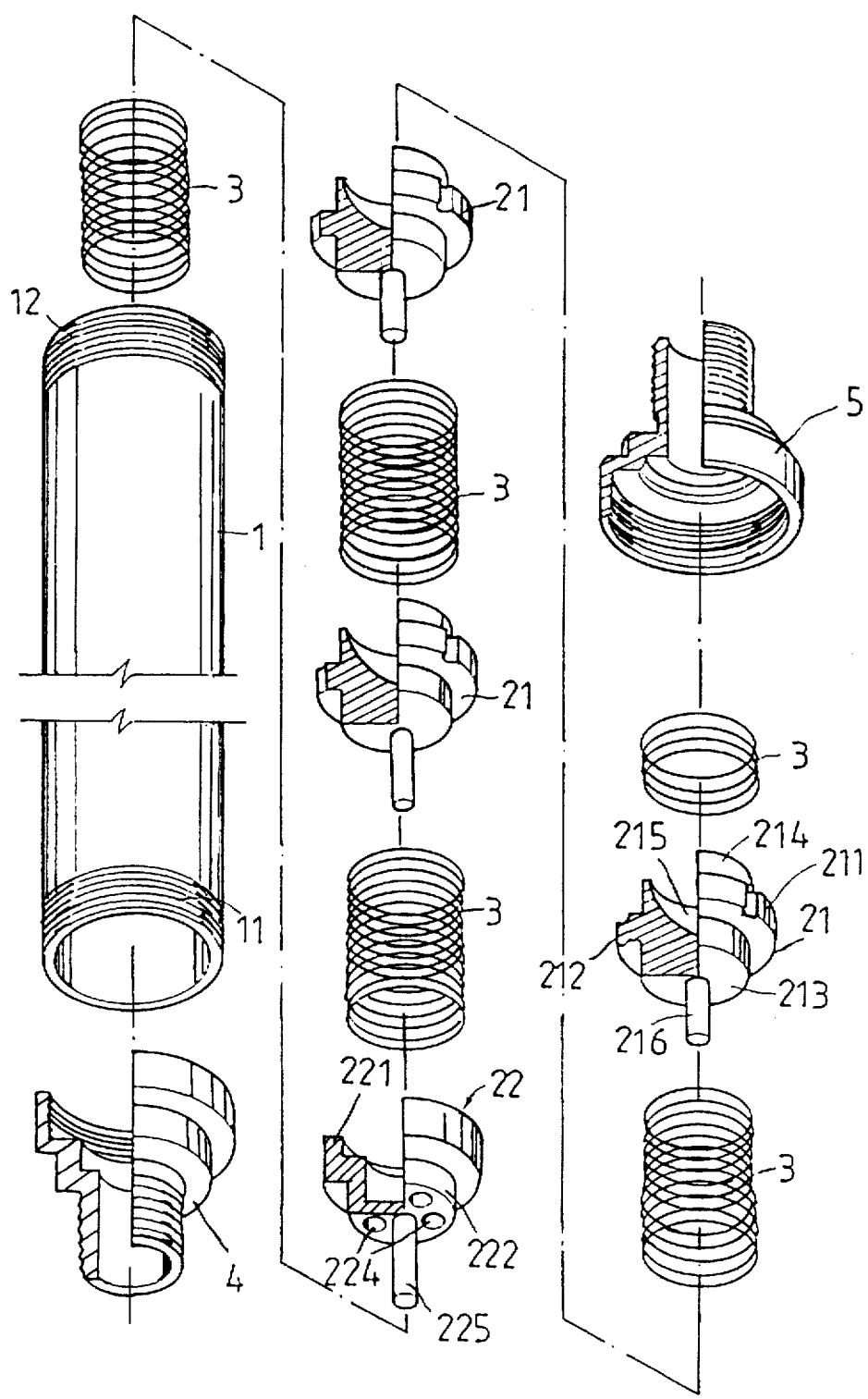
FIG. 1 is an exploded perspective of the present invention.

Please refer to FIG. 1. The present invention relates to a means for automatically regulating water pressure in water pipe. The means mainly includes a tube 1 connected between two sections of water pipes for water to flow therethrough, a plurality of upper pressure-reduction members 21, a lower pressure-reduction member 22, a plurality of pressure-reduction springs 3 each being disposed between two adjacent pressure-reduction members, a water outlet bronze head 4 located below the lower pressure-reduction member 22, and a water inlet bronze head 5 located above the first upper pressure-reduction member 21 in the tube 1.

The tube 1 is made of stainless steel material. A lower threaded portion 11 and an upper threaded portion 12 are formed at two outer ends of the tube 1 for the water outlet bronze head 4 and the water inlet bronze head 5 to screw thereto, respectively.

The upper and the lower pressure-reduction members 21, 22 can be made of stainless steel or plastic material. Both the upper and the lower pressure-reduction members have a middle portion having an external diameter slightly smaller than an inner diameter of the tube 1. The middle portion 211 of the upper pressure-reduction member 21 is formed at an outer periphery with a plurality of grooves 212 for water to flow therethrough. The upper pressure-reduction member 21 each has a top portion 214 and a bottom portion 213 respectively extended upward and downward from the middle portion 211. The top and the bottom portions 214, 213 have an external diameter smaller than that of the middle portion 211. A recess 215 with concave surface is formed at a central area of the top portion 214. And, a spacing rod 216 downward projects from the bottom portion 213.

The lower pressure-reduction member 22 has a bottom portion 222 downward extends from the middle portion 221. A plurality of through holes 224 are formed on the bottom portion 222 and a spacing rod 225 downward projects from the bottom portion 222.

The pressure-reduction spring 3 is disposed between the water inlet bronze head 5 and the first upper pressure-reduction member 21, between two adjacent upper pressure-reduction members 21, between the lowest upper pressure-reduction member 21 and the lower pressure-reduction member 22, and between the lower pressure-reduction member 22 and the water outlet bronze head 4. The pressure-reduction springs 3 are made of stainless steel material.

Figure 3:
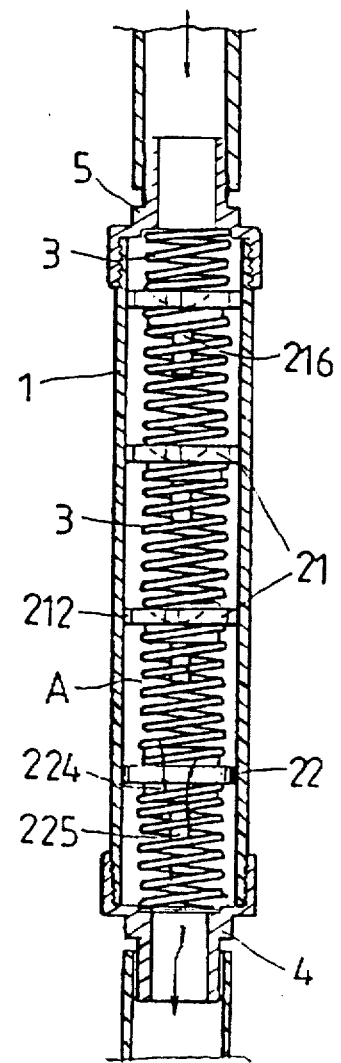
FIG. 3 illustrates a condition in the tube when water with low pressure flows therethrough.

Please refer to FIG. 3. When a small volume of water flows into the tube 1 via the water inlet bronze head 5, little pressure is applied on the upper pressure-reduction members 21. At this point, the pressure-reduction springs 3 are in an extended state with a large clearance A existing between every two adjacent turns of the springs 3. Water is allowed to freely flows down the tube 1 via the grooves 212 on each upper pressure-reduction member 21 and into inner spaces defined by the springs 3 via the clearances A, and then finally flows out of the tube 1 via the through holes 224 formed on the lower pressure-reduction member 22.

Figure 2:
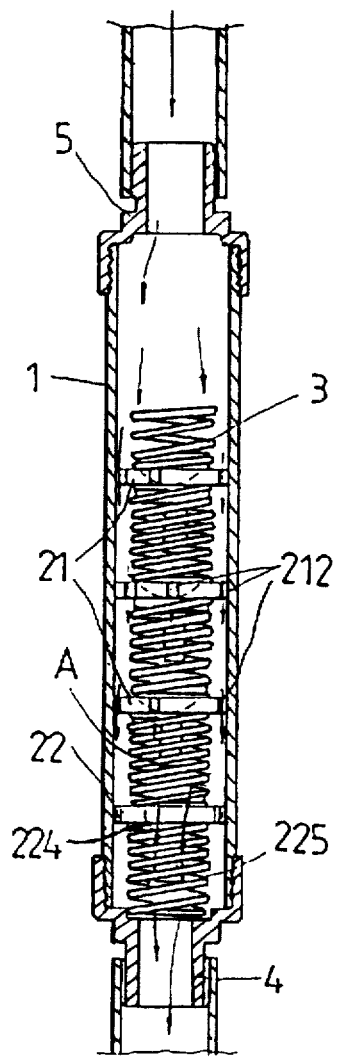
FIG. 2 illustrates a condition in the tube when water with high pressure flows therethrough.

Please now refer to FIG. 2. When a large volume of water flows into the tube 1 via the water inlet bronze head 5, not all the water can instantaneously pass the grooves 212 of the upper pressure-reduction members 21 to flow down the tube 1. At this point, a part of the water is collected in the concave recesses 215 of the upper pressure-reduction members. 21. When a water pressure in the tube 1 becomes higher than a spring force of the pressure-reduction spring 3, the upper pressure-reduction members 21 are pushed by the water collected in the recesses 215 to move downward in the tube 1. The downward movement of the upper pressure-reduction members 21 compresses the pressure-reduction springs 3 10 below them and gradually reduces the clearances A between every two adjacent turns of the springs 3. On the other hand, the other part of the water passes the grooves 212 of the upper pressure-reduction members 21 and keeps flowing down through the tube 1. Since the clearances A between every two adjacent turns of the springs 3 are reduced, only a part of the water flowing down in the tube 1 can pass the reduced clearances A and enters into the spring 3 to finally pass the through holes 224 of the lower pressure-reduction member 22 and flows out of the tube 1.

When the downward pushed upper pressure-reduction members 21 cause the pressure-reduction springs 3 to be completely compressed, the spacing rod 216 of a higher upper pressure-reduction member 21 shall press against the next higher upper pressure-reduction member 21 or, for the lowest upper pressure-reduction member 21, against the lower pressure reduction member 22, allowing a space to leave between every two adjacent pressure-reduction members 21 for the water to successfully flow through the grooves 212 or between the lowest upper pressure-reduction member 21 and the lower pressure-reduction member 22 for the water to successfully flow through the through holes 224 thereof in a controlled manner and finally flows out of the tube 1. The spacing rod 225 of the lower pressure-reduction member 22 also allows a space left between the lower pressure-reduction member 22 and the bottom end of the tube 1. By this way, water pressure in the tube 1 is automatically regulated and a steady water supply can be maintained.

The above arrangements of means for automatically regulating water pressure in water pipe enable effective regulation of water pressure and steady water supply while its special design requires only low manufacture cost. The means of the present invention for automatically regulating water pressure in water pipe is therefore very practical and economical in use.

Although the present invention has been described with the preferred embodiments thereof, it should be noted that the present invention is not limited to such embodiments and various changes can be made without departing from the spirit of the present invention or the scope of the subjoined claims.

What is claimed is:

1. A device for automatically regulating water pressure in a water pipe, comprising a tube with a water inlet and a water outlet connected to the water pipe and a plurality of pressure-reduction members and springs alternatively disposed in the tube to bias the pressure-reduction members toward the water inlet; said pressure-reduction members each having an expanded middle portion which has an external diameter smaller than an inner diameter of said tube; at least one of said pressure-reduction members having a circumferential peripheral surface with a plurality of grooves, said pressure-reduction member closest to the water outlet having a plurality of through holes for water to flow through, whereby the pressure of water flowing through said tube from the water inlet to the water outlet is automatically regulated.

2. The device for automatically regulating water pressure in a water pipe as claimed in claim 1, wherein said at least one pressure-reduction member has a portion facing the water inlet with a concave recess therein.

3. The device for automatically regulating water pressure in a water pipe as claimed in claim 1, wherein said pressure-reduction members each have a bottom surface with a spacing rod extending therefrom.

* * * * *